June 19, 1928.  
F. SNYDER  
FLUID ACTUATED BRAKE  
Filed April 2, 1924
1,674,378
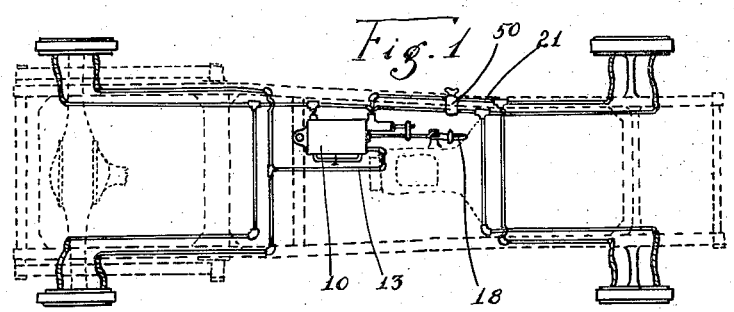
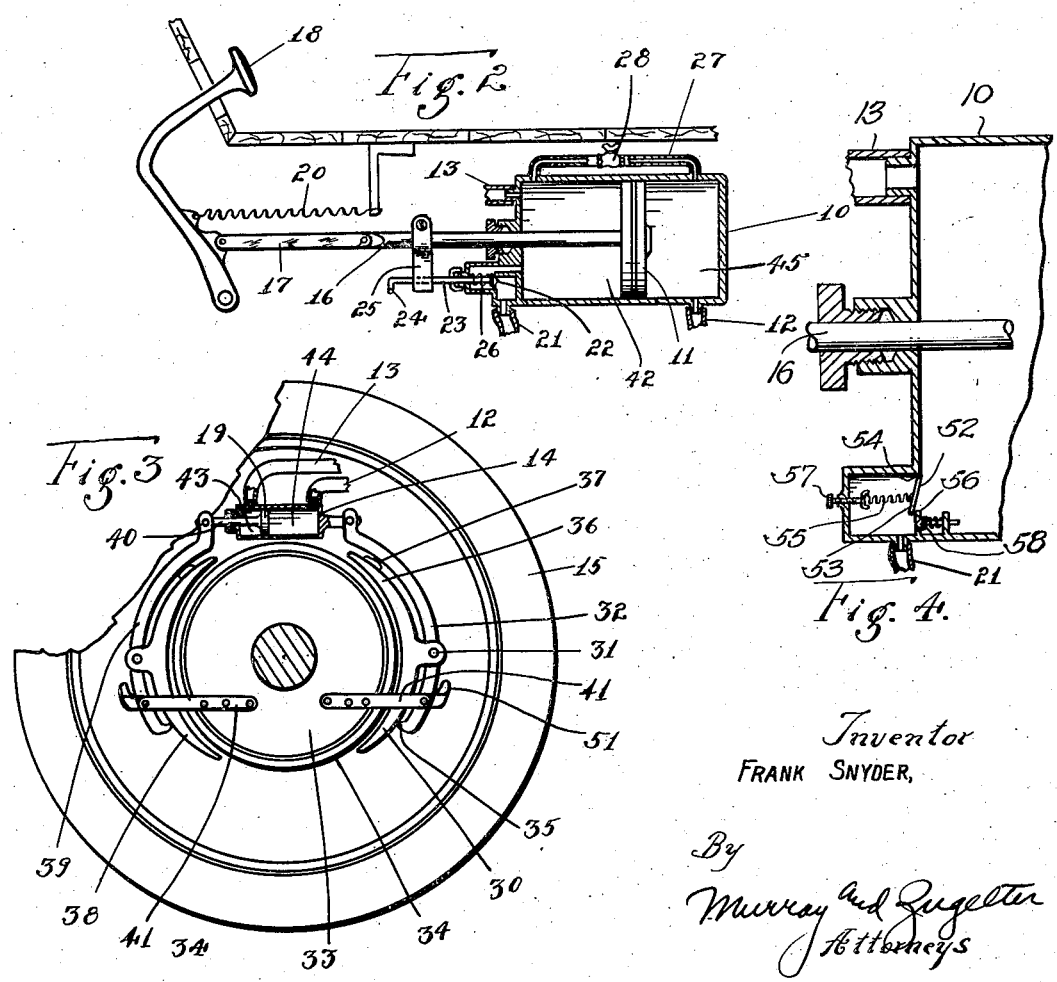
Inventor  
FRANK SNYDER, Patented June 19, 1928.

1,674,378

UNITED STATES PATENT OFFICE.

FRANK SNYDER, OF HUNTINGTON, WEST VIRGINIA.

FLUID-ACTUATED BRAKE.

Application filed April 2, 1924. Serial No. 703,803.

My invention relates to brakes for vehicles such as motor vehicles and is intended to provide a simple and efficient device for operating brakes by means of fluid pressure.

Another object of my invention is to provide a device of the class described, that may be readily adjusted.

Another object of my invention is to provide a device wherein dragging of brake elements is eliminated.

Another object of my invention is to provide a device wherein the brakes are positively set and released.

These and other objects are attained by the means described herein and disclosed in the accompanying drawings, in which, Fig. 1 is a diagrammatic plan view of a motor vehicle on which is mounted a device embodying my invention.

Fig. 2 is an enlarged fragmental elevation, parts shown in section, of a device embodying my invention.

Fig. 3 is a fragmental view, parts shown in section, of a wheel and brake associated therewith and embodying my invention.

Fig. 4 is a detail view showing a modified form of a control means embodying my invention.

My invention, as disclosed herein, is shown as adapted to be operative upon all four wheels of a motor vehicle. It is readily evident that same may be applied to one or any number of brake devices.

My invention comprises a fluid supply tank 10 within which a piston 11 is reciprocally contained. The opposite ends of the cylinder 10 communicate by suitable tubings 12 and 13 with opposite ends of cylinders 14, one of which cylinders 14 is mounted adjacent each of the wheels 15 of the vehicle. The piston 11 may be reciprocated by means of a piston rod 16 that has its forward end pivotally connected to a link 17 and which link is pivotally connected at its forward end with a foot lever 18. From the foregoing, it will be evident that reciprocation of the piston 11 in the primary chamber or casing 10 will serve to actuate the secondary piston 19, one of which is disposed in each of the cylinders 14. After the piston 11 has been moved forwardly by means of the lever 18, same may be returned by any suitable means such as a spring 20. By reference to Fig. 2 it will be observed that a flexible tube 21 may communicate with the interior of the casing 10, and that a valve 22 may control communication between said tube and the interior of the casing. The purpose of this structure is to permit the rear brakes to be applied somewhat in advance of the forward brakes. This is accomplished by normally having the valve 22 close off communication between the tube 21 and the interior of the casing 10 and after some of the fluid under pressure has passed through tube 13 to the rear brakes, the valve 22 may be unseated by the engagement of the hooked end 24 of the valve stem 23 upon the depending strap 25 carried by the piston rod 16, and through which strap the valve stem 23 reciprocally extends. A suitable spring 26 yieldingly retains the valve 22 upon its seat. The extent to which the foregoing variation in application of the front and rear brakes is employed may be modified by adjusting the band or strap 25 longitudinally of the piston rod 16. A similar effect may be accomplished by providing a structure as shown in Fig. 4, wherein an impeded flow of fluid under-pressure may pass to the tube 21, while a practically unobstructed flow may pass from the tube 21 into the casing 10. The modified structure shown in Fig. 4 comprises a valve controlled outlet 52 having a suitable swing check valve 53 hinged at 54. A suitable expansion spring 55 is employed for yieldingly retaining the valve 53 against its seat 56. The expansion spring 55 has its one end secured to the valve 53 and its other end in abutment upon a suitable adjusting screw 57. The spring 55 yieldingly resists movement of the valve 53 when under influence of the fluid in casing 10, thereby permitting an unobstructed flow through the tube 13 to the rear brakes and retarding the flow through tubing 21 to the forward brakes. The valve seat 56 is provided with a second valve seat and valve 58, similar to the valve 22, which permits the fluid to flow back into the tank 10 when the brakes are released. This may also be accomplished, by means of a pair of valves opening in opposite directions, the larger valve carrying the smaller valve, and serving to engage its seat, when pressure is applied to the fluid for applying the brakes. A by-pass 27 connects the opposite ends of the casing 10, and a valve 28 controls the flow of fluid through the by-pass 27. From this it will be readily evident that the piston 11 may be adjusted to various normal positions in the casing 10, by opening the valve 28, and then moving the piston 11, by means of the foot brake, until the piston is positioned in the desired location, whereupon the valve 28 would be closed.

The brake shoes 30 are pivotally supported intermediate their ends, by means of pivots 31 upon actuating arms 32. Each actuating arm 32, adjacent its lower end, is fixedly mounted upon, or in relation to the vehicle brake drum housing 33. The extreme lower end of the arm 32 is developed into a lug 35 that may engage the brake shoe 30 below the pivot 31 and thereby preclude the lower end of the brake shoe moving about the pivot 31, so that the upper end 36 of the brake shoe cannot engage or ride upon the brake drum when the brakes are in released position. The upper end of the brake shoe carries a suitable buffer 37 that may engage the arm 32 adjacent the upper end thereof, for precluding the lower end of the brake shoe 30 engaging the drum 34 when the brake is in released position. The extreme upper end of the arm 32 is pivotally connected to one end of the cylinder 14. A second brake shoe 38 is mounted upon an arm 39 in the same way as is the brake shoe 30 mounted upon arm 32. The arm 39 has its upper end pivotally mounted upon the piston rod 40 associated with the piston 19. Suitable straps or bars 41 may be employed for providing a fixed pivotal mounting for the arms 32 and 39.

The operation of my device is as follows:

Forward pressure exerted upon the foot lever 18 will move the piston 11 forwardly and cause a flow of fluid through the tubes 13 and 21, from the forward chamber 42 in the cylinder 10 to the chambers 43 in the cylinders 14. At the same time fluid within the chamber 44 of the cylinder 14 may flow through tubes 12 to the rear chamber 45 in the casing 10. The flow of fluid under pressure to the chamber 43 in the casing 14 serves to contract the upper ends of the arms 32 and 39, thereby bringing the brake shoes 30 and 38 into binding engagement upon the drum 34. When pressure is released upon the lever 18, the spring 20 returns the parts to their normal position, and the flow of fluid to the chamber 44 of the cylinder 14 serves to expand the upper ends of the arms 32 and 39, thereby releasing the brake drums 34 from the brake shoes. Variations in the degree, and time of application between the front and rear brakes of a vehicle, may be modified by commensurate adjustment of the structures shown in Figs. 2 and 4.

In the structure shown in Fig. 2, the fluid may return from the cylinders associated with the front wheels by unseating the valve 22 against the yielding pressure of the spring 26.

The tubes leading to and from the cylinders associated with the front wheels may be placed into communication by means of a suitable valve 50, which valve serves also to disconnect the said cylinders and the main cylinder or reservoir thereby rendering the front wheel brakes inoperative.

In order to preclude wabbling or swaying of the secondary cylinders and the arms associated therewith, the bars 41 may have their outer or free ends developed into lugs 51 that engage the outer faces of the arms above the pivotal mountings of the arms on said bars.

What I claim is:

1. In a fluid brake of the class described, the combination of a main reservoir, a piston reciprocally contained in the reservoir intermediate the ends thereof, a secondary reservoir, a piston in the secondary reservoir, means establishing independent communication between the opposite ends of the main reservoir with opposite ends of the secondary reservoir, and brake shoes, one shoe having a mounting upon the secondary piston, and one shoe having a mounting upon the secondary reservoir.

2. In a device of the class described the combination of a movable brake drum, a pair of arms each having a pivotal mounting fixed relatively to the drum, a brake shoe carried by each arm, a cylinder, a piston within the cylinder, a piston rod carried by the piston and extending from one end of the cylinder, one arm having a pivotal mounting on the piston rod, the other arm having a pivotal mounting on the cylinder, and means for selectively directing fluid into the cylinder on opposite sides of the piston.

3. In a device of the class described the combination of a movable brake drum, a pair of arms each having a pivotal mounting fixed relatively to the drum, a brake shoe pivotally supported by each arm and adapted to engage the brake drum, a cylinder, a piston within the cylinder, a piston rod carried by the piston, and extending through one end of the cylinder, one of the arms having a pivotal mounting upon the piston rod, the other arm having a pivotal mounting upon a second end of the cylinder, and means for selectively directing fluid under pressure into the cylinder, at opposite sides of the piston.

4. In a device of the class described the combination of a primary cylinder, a valve controlled by-pass for connecting the ends of the cylinder, a piston within the cylinder, a secondary cylinder, a piston within the secondary cylinder, a pair of tubes for connecting opposite ends of the primary cylinder with opposite ends of the secondary cylinder, a pair of arms, one having a pivotal mounting upon the piston associated with the secondary cylinder, and the other having a pivotal mounting upon the secondary cylinder, means for actuating the piston in the primary cylinder, whereby to actuate the secondary piston, brake shoes associated with the secondary arms, and a drum adapted to be engaged by the brake shoes.

5. In a device of the class described the combination of a main cylinder, a piston within the main cylinder, a pair of auxiliary cylinders, tubing connecting opposite ends of the main cylinder with opposite ends of the auxiliary cylinders, means associated with the tubing leading to one end of one of said auxiliary cylinders for retarding the flow of a fluid from the main cylinder to one end of one of said secondary cylinders, and pistons operating within the secondary cylinders between the opposite ends thereof and between the tubing connections at the ends of said auxiliary cylinders.

6. In a device of the class described the combination of a main cylinder, a piston within the main cylinder, a pair of auxiliary cylinders, tubing connecting opposite ends of the main cylinder with opposite ends of the auxiliary cylinders and means associated with the tubing leading to one end of one of said auxiliary cylinders for retarding the flow of a fluid from the main cylinder to one end of one of said secondary cylinders and for permitting an unimpeded return flow to the main cylinder, and pistons operating within the secondary cylinders between the opposite ends thereof and between the tubing connections at the ends of said auxiliary cylinders.

7. In a brake device of the class described the combination of a pair of arms, a lug formed at one end of each of the arms, a brake shoe pivotally supported by each arm intermediate the ends of the arm, a brake drum adapted to be engaged by the shoes, means for providing fixed pivotal mountings for the arms intermediate the lugs and pivotal brake shoe mountings on the arms, the lugs being adapted to engage the brake shoes adjacent one end of said shoes and at one side of the pivotal mountings of the shoes, means associated with the shoes, on the opposite sides of their pivotal mountings on the arms, for engaging the arms, and means for moving the second mentioned ends of the arms about the fixed pivotal mountings of the arms for binding and releasing the shoes upon the drum.

8. In a brake device of the class described the combination of a pair of arms, a lug formed at one end of each of the arms, a brake shoe pivotally supported by each arm intermediate the ends of the arm, a brake drum adapted to be engaged by the shoes, means for providing fixed pivotal mountings for the arms intermediate the lugs and pivotal brake shoe mountings on the arms, the lugs being adapted to engage the brake shoes adjacent one end of the shoes and to one side of the pivotal mountings of the shoes, means associated with the shoes on the opposite sides of their pivotal mountings on the arms, for engaging the arm, means for moving the second mentioned ends of the arms about the fixed pivotal mountings of the arms for binding and releasing the shoes upon the drum, said means comprising a cylinder having its one end pivotally connected to a second end of one of said arms, a piston within the cylinder extending from a second end of said cylinder and having a pivotal mounting upon a second end of the other of said arms, and means for directing fluid under pressure into the cylinder on opposite sides of the piston.

9. In a device of the class described the combination of a cylinder, a piston reciprocally contained within the cylinder, means for reciprocating the piston in the cylinder, an auxiliary cylinder, a piston within the auxiliary cylinder, tubing connecting opposite ends of the main cylinder with opposite ends of the auxiliary cylinder whereby reciprocation of the piston in the main cylinder will effect a corresponding reciprocation of the piston in the auxiliary cylinder, an expansible braking means and connecting means for transmitting the relative reciprocating movement of the auxiliary cylinder and its piston to the expansible braking means for expanding and contracting said braking means.

In testimony whereof, I have hereunto subscribed my name this 24th day of March, 1924.

FRANK SNYDER.